E. R. BULE.
WHEELED ATTACHMENT FOR SLEDS.
APPLICATION FILED JAN. 13, 1914.
1,123,676.
Patented Jan. 5, 1915.
2 SHEETS—SHEET 1.
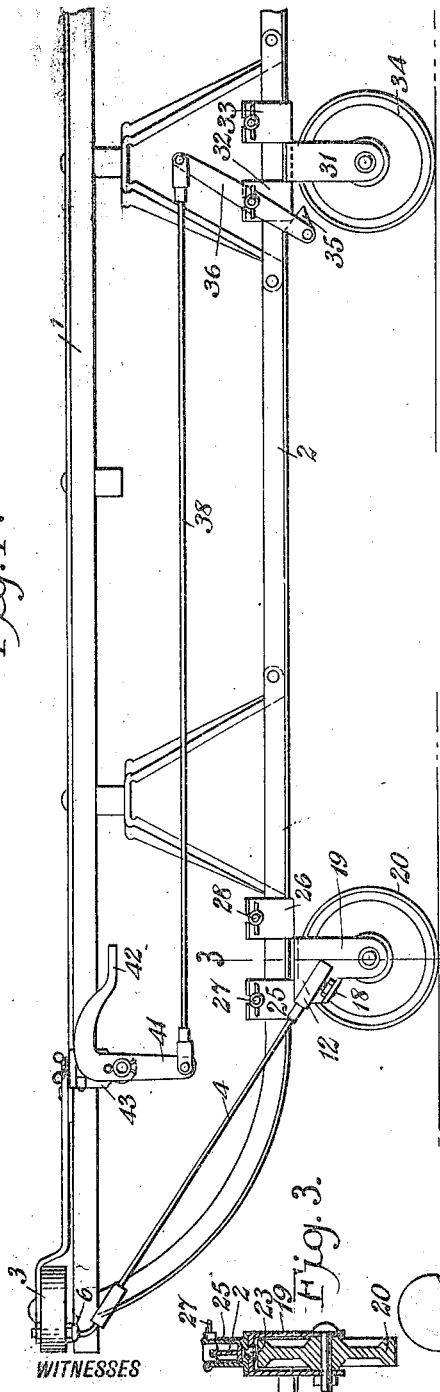
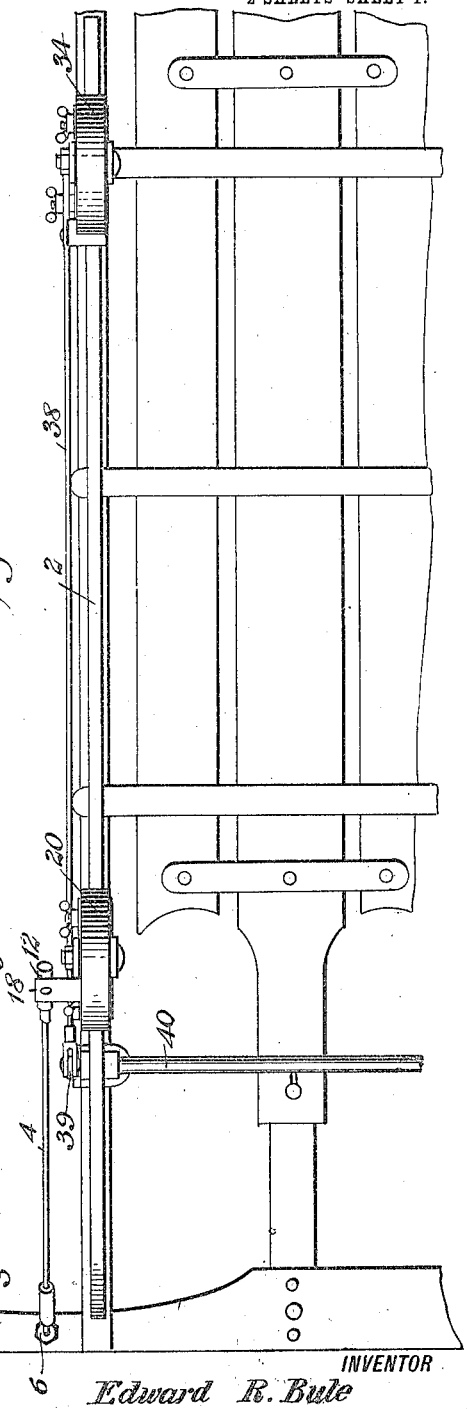
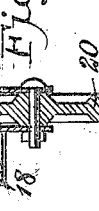
WITNESSES
INVENTOR
Edward R. Bule
BY
ATTORNEYS E. R. BULE.
WHEELED ATTACHMENT FOR SLEDS.
APPLICATION FILED JAN. 13, 1914.
1,123,676.
Patented Jan. 5, 1915.
2 SHEETS—SHEET 2.
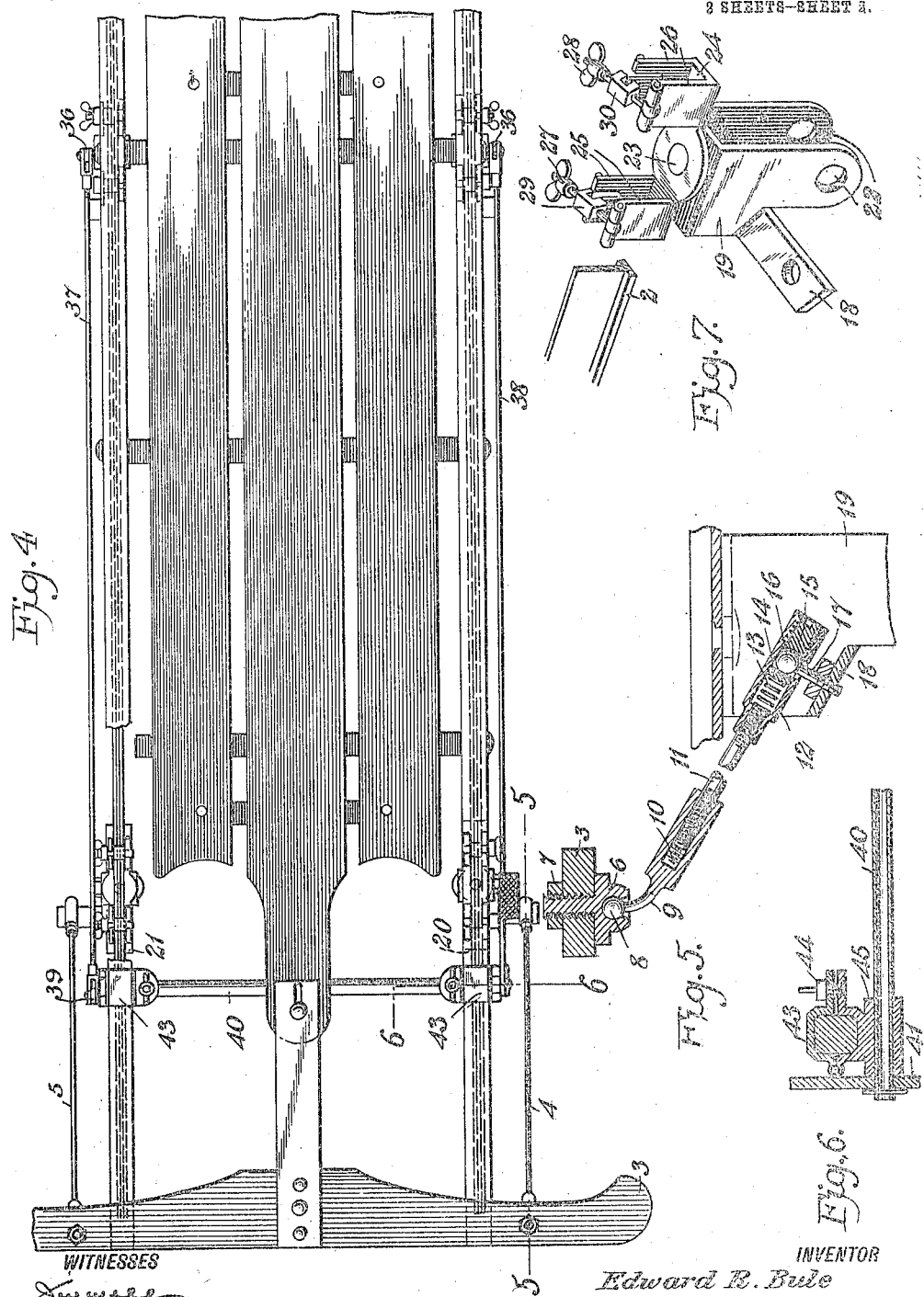
WITNESSES
INVENTOR
Edward R. Bule
BY
ATTORNEYS

UNITED STATES PATENT OFFICE.

EDWARD ROBERT BULE, OF NEW YORK, N. Y.

WHEELED ATTACHMENT FOR SLEDS.

1,123,676.   Specification of Letters Patent.   Patented Jan. 5, 1915.

Application filed January 13, 1914.   Serial No. 811,844.

*To all whom it may concern:*

Be it known that I, EDWARD R. BULE, a citizen of the United States, and a resident of the city of New York, borough of Manhattan, county and State of New York, have invented a new and Improved Wheeled Attachment for Sleds, of which the following is a full, clear, and exact description.

This invention relates to improvements in attachments for sleds, and has for an object to provide an improved structure which may be readily applied to substantially any kind of sled so as to convert the same from a sled into a wheeled vehicle.

A further object of the invention is to provide a plurality of wheeled attachments adapted to be clamped to the runners of a sled, and means for connecting the front wheels of the attachment with the steering device of the sled, whereby steering may be performed in the usual manner.

A still further object of the invention is to provide a wheeled attachment for a sled so that the sled may be used either in the usual manner of a sled, or when the attachment is secured may be used as a wheeled coasting device where the ordinary sled could not be used.

In carrying out the object of the invention any desired kind of sled may have the attachments secured thereto. In constructing and arranging the attachment in position, clamping members are provided for engaging the runners of the sled so as to hold the rear wheels properly in place. The rear clamping members are preferably arranged as a rigid support for the rear wheels, while the front clamping members are provided with a swiveled portion so that the front wheels may be shifted for steering purposes. A suitable brake is provided for the rear wheels, while the front wheels are connected with the usual steering mechanism of the sled so that the device may be steered in the usual manner. If the sled is not provided with a steering member a suitable steering cross bar may be placed in position on the sled and connected to the front wheels.

In the accompanying drawings—Figure 1 is a side view of a sled with an attachment embodying the invention secured thereto; Fig. 2 is a bottom plan view of part of the sled and attachment shown in Fig. 1; Fig. 3 is a detailed fragmentary sectional view through Fig. 1 on line 3—3; Fig. 4 is a top plan view of the structure shown in Fig. 1; Fig. 5 is an enlarged sectional view through Fig. 4 on line 5—5; Fig. 6 is a section through Fig. 4 on line 6—6, the same being shown on an enlarged scale; and Fig. 7 is an enlarged detailed perspective view of one of the front clamping members, part of a runner being shown in connection therewith.

Referring to the accompanying drawings by numeral 1 indicates the top of a sled, and 2 the runners. The sled shown is formed with a flexible front portion, though the attachment could be used in other forms of sled. This particular form of sled carries a steering cross bar 3 to which are connected the steering rods 4 and 5, embodying certain features of the invention. These steering rods are constructed and arranged as shown in Fig. 5, wherein it will be observed that a socket member 6 is clamped to the cross bar 3 by a suitable bolt 7. The socket member 6 is designed to receive the head 8 of bar 9, which bar is provided with a longitudinally threaded bar 10 for receiving rod 11. Rod 11 is threaded into a tubular member 12 at the lower end, which tubular member carries a spring 13 pressing against follower 14, and also a threaded plug 15. Between the threaded plug 15 and follower 14 is the head 16 of bolt 17, which bolt is threaded into the lug or extension 18 on the U-shaped bracket 19 (Fig. 7). By this construction and arrangement a flexible connection is provided between bar 3 and the front wheels 20 and 21. The U-shaped bracket 19 is provided with apertures 22 for receiving the respective shafts, which support the wheels 20 and 21 in members 19. It will be observed that there is one member 19 on each side of the sled so that the description of one will apply to both.

Referring more particularly to Fig. 7, it will be observed that a pivotal rivet or other suitable member 23 is provided for pivotally connecting member 22 with a swinging clamp 24. The swinging clamp 24 is provided with upstanding members 25 and 26, which are adapted to be clamped to the runners 2 by clamping bolts 27 and 28. These bolts are preferably provided with winged nuts so as to more readily apply and remove the device. Suitable spacing lugs 29 and 30 are arranged on the bolts 27 and 28 so as to allow the members 25 and 26 to clamp against runners 2, but not allow these side members to be entirely collapsed. It will be observed that the bolts 27 and 28 are hinged to one of the side members with the opposite end passing through a suitable slot, whereby the bolts may be quickly loosened and pivotally moved to a position out of the way so as to quickly remove the attachment.

At the rear a U-shaped bracket 31 is provided which is preferably formed integral with the side members 32 and 33, which side members are similar to the side members 25 and 26, and are operated in the same manner so that no additional description thereof will be necessary. By forming the U-shaped member 31 integral or rigidly secured to members 32 and 33 the rear support for the wheels 34 will hold the wheels in proper alinement at all times with the runners 2, while the pivotal arrangement of members 19 at the front will allow wheels 20 and 21 to be turned for steering the sled.

In connection with the rollers a suitable brake is provided formed with a brake shoe 35 adapted to engage the rear wheels 34. Each of the brakes 35 is rigidly secured to a pivotally mounted lever 36, which is preferably held in position by one of the bolts clamping member 32 in place. The levers 36 are pivotally connected with connecting rods 37 and 38 (Fig. 4). Rod 37 is connected with a suitable crank 39 which is rigidly secured to shaft 40, which shaft in turn has rigidly secured thereto crank 41 which extends upwardly, and is bent over for providing an operating lever 42, shown more particularly in Figs. 1 and 4. Crank 41 and crank 39 are of the same length so that the brake shoes 35 on both sides of the sled will operate in a similar direction. It will be observed that the rods 37 and 38 are threaded at their ends so that their connection with cranks 39 and 41 and levers 36 may be adjusted so as to cause an equal application of pressure on the respective shoes 35. In order to properly hold shaft 40 in position clamping members 43 are provided for clamping the upper part of the frame of the sled. These clamping members are shown more particularly in Fig. 6, wherein it will be observed that a clamping winged nut 44 is used so as to readily clamp the members 43 in position. The lower part of members 43 is provided with a journaled portion 45 in which the shaft 40 freely rotates. By this construction and arrangement when lever 42 is depressed both of the brake shoes are operated.

In operation, the sled may be used in the usual manner, and steering bar 3 used to deflect the front part of the runners so as to properly steer the sled. The sled when used in this manner is of course used on snow, ice, or other slippery surface. When it is desired to use the sled on an ordinary pavement or smooth surface which is not slippery, the various attachments described are clamped to the sled and connected up so as to operate as part of the sled. When this has been done the sled may then be used to coast down inclines or may be used as an ordinary wagon, the steering device of the sled being connected with the steering device of the attachment.

What I claim is—

1. In a wheeled attachment for sleds, means for securing a pair of rear wheels to the runners of said sled, clamping means connected to each of the runners of said sled near the front, said clamping means including an apertured base, upstanding arms partially encircling said runners, pivotally mounted bolts for moving said upstanding members toward each other, a sliding block arranged on each of said bolts straddling the runners of the sled, and a nut on each of said bolts for locking the same in position and pressed against the runners of the sled, a yoke for receiving front traction wheels, means extending through the yoke and the aperture in said base for swiveling the yoke to the base, and means connected with said yoke for connecting the same to the steering device of the sled.

2. In a wheeled attachment for sleds, means for securing a pair of rear wheels to said sled, clamping means connected to each of the runners of said sled near the front, a swiveled yoke associated with the clamping means of each of said runners, a traction wheel mounted on each of said yokes, each of said yokes being formed with a lug bent therefrom and extending substantially at a right angle, each of said lugs being formed with an aperture, a journal member clamped to each of said lugs, said journal member being provided with a rounded head, a journal box fitted on to said rounded head, said journal box including a yielding friction member, a connecting rod for each of said journal boxes for connecting the journal boxes with the steering means of said sled, and a substantially universal connection for connecting said rods with said steering means.

3. In a wheeled attachment for sleds, means for securing a pair of traction wheels to a sled at the rear, means for securing a pair of traction wheels to a sled at the front, said last mentioned means including a swiveled yoke for the traction wheels and means connecting each of said swiveled yokes with the steering mechanism of the sled, said last mentioned means including a connecting rod having a ball at one end and a socket rigidly connected with the steering means of the sled, said socket interlocking with said ball, a bearing box at the opposite end of said rod to said ball, said bearing box comprising a housing, a removable end for said housing, a friction bearing plate and a spring for giving said bearing plate a continual tendency to move toward said removable head, and a bar connected to said yoke, said bar being formed with a rounded head or knob fitting into said bearing box.

In testimony whereof I have signed my name to this specification in the presence of two subscribing witnesses.

EDWARD ROBERT BULE.

Witnesses:
  ROBERT B. MCCUTCHEON,
  C. S. ANDREWS, Jr.